United States Patent
Gorjiara et al.

(10) Patent No.: US 10,963,913 B2
(45) Date of Patent: Mar. 30, 2021

(54) AUTOMATICALLY GENERATING TARGETING TEMPLATES FOR CONTENT PROVIDERS

(71) Applicant: Microsoft Technology Licensing, LLC, Redmond, WA (US)

(72) Inventors: Bita Gorjiara, Sunnyvale, CA (US); Zhanwei Sun, Belmont, CA (US); Luke Kopakowski, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 16/198,841

(22) Filed: Nov. 22, 2018

(65) Prior Publication Data
US 2020/0167821 A1    May 28, 2020

(51) Int. Cl.
*G06Q 30/02*        (2012.01)
*G06F 16/9532*    (2019.01)
*G06F 16/2457*    (2019.01)

(52) U.S. Cl.
CPC ... *G06Q 30/0254* (2013.01); *G06F 16/24578* (2019.01); *G06F 16/9532* (2019.01); *G06Q 30/0241* (2013.01); *G06Q 30/0251* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 2005/0228797 | A1* | 10/2005 | Koningstein | G06Q 30/02 |
| 2006/0242013 | A1* | 10/2006 | Agarwal | G06Q 30/0263 |
| | | | | 705/14.49 |
| 2008/0249853 | A1* | 10/2008 | Dekel | G06Q 30/0251 |
| | | | | 705/14.48 |
| 2009/0326947 | A1* | 12/2009 | Arnold | G06Q 30/02 |
| | | | | 704/257 |
| 2010/0082427 | A1* | 4/2010 | Burgener | G06Q 30/02 |
| | | | | 705/14.49 |
| 2011/0251889 | A1* | 10/2011 | Simard | G06Q 30/0244 |
| | | | | 705/14.43 |
| 2014/0058826 | A1* | 2/2014 | Ogawa | G06Q 30/02 |
| | | | | 705/14.43 |
| 2015/0046255 | A1* | 2/2015 | McAteer | G06Q 30/0241 |
| | | | | 705/14.49 |

\* cited by examiner

*Primary Examiner* — Vincent M Cao
(74) *Attorney, Agent, or Firm* — Hickman Becker Bingham Ledesma LLP; Daniel D. Ledesma

(57) ABSTRACT

Techniques for automatically generating targeting templates are provided. In one technique, multiple sets of targeting criteria provided by different content providers are identified. Based on the multiple sets of targeting criteria, multiple clusters of sets of targeting criteria are created. For each cluster, a targeting template is generated based on a set of targeting criteria that belong to that cluster. In another technique, multiple users are identified and for each user, a set of attribute-value pairs of that user is identified and added to a plurality of attribute-value pairs. Based on the plurality of attribute-value pairs, a targeting template that specifies targeting criteria is generated and presented for selection.

20 Claims, 9 Drawing Sheets

INCLUDE people who meet one or more of these criteria

Member Skills

✓ Java    ✓ Apache Spark    ✤ Add Member Skills

---

AND people who meet one or more of these criteria

Job Function

✓ Information Technology    ✓ Engineering    ✤ Add Job Function

---

AND people who meet one or more of these criteria

Job Seniority

✓ Director    ✤ Add Job Seniority

---

AND people who meet one or more of these criteria

Company Industry

✓ Internet    ✤ Add Company Industry

---

AND people who meet one or more of these criteria

Company Size

✓ 51-200 employees    ✤ Add Company Size

AUTOMATICALLY GENERATING TARGETING TEMPLATES FOR CONTENT PROVIDERS

TECHNICAL FIELD

The present disclosure relates to targeting templates and, more particularly, to automatically generating targeting templates based on clustering sets of targeting criteria from multiple content providers.

BACKGROUND

Many content providers rely on third-party content delivery systems to distribute their respective electronic content through computer networks to computing devices of end users who might be interested in the electronic content. When interacting with a content delivery system to create a content delivery campaign, a content provider needs to translate their ideal target user to targeting criteria supported by the content delivery system. Such a "translation" is often a tedious and time-consuming process and requires ramping up on each new content delivery platform and understanding its targeting capabilities. A significant number of content providers drop out at the targeting stage of the campaign creation process. Furthermore, content providers might not utilize the full targeting capabilities and, as a result, reach only a small subset of the target audience available on that platform.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6C is a screenshot of an example user interface that displays data from a targeting template, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically generating targeting templates for content providers are provided. In one technique, sets of targeting criteria specified by multiple content providers are grouped based on similarity to one another in order to create clusters. From a cluster of similar sets of targeting criteria, at least a single targeting template is generated. In another technique, attribute values of a certain set of users are identified and analyzed to generate a targeting template.

Regardless of how a targeting template is generated, when a content provider selects the targeting template during a content delivery campaign creation process, the content provider is not required to individually select or specify any of the attribute values included the targeting template. In this way, it is much easier for content providers to create a content delivery campaign. Also, content providers may be assured that the targeting template has a sufficient audience size. Embodiments represent an improvement in a technological process. Indeed, the improvement allows computers to produce relevant targeting templates, which has never been done automatically before. Embodiments are, thus, directed to a technological improvement over existing, manual techniques.

System Overview

Figure 1:
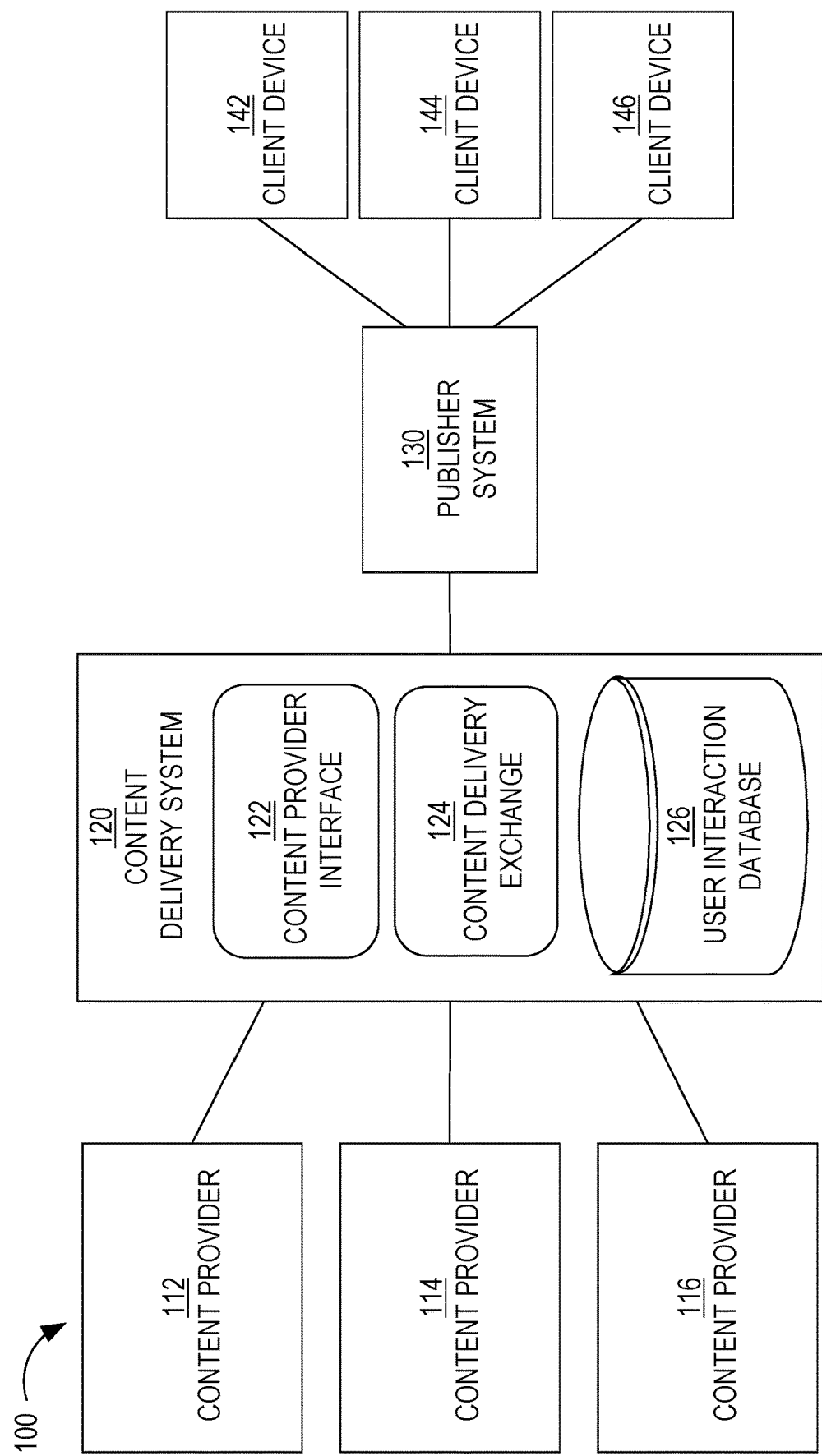
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example criteria include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title (of which a user may have more than one), employment status, industry, job function, field of study, academic degrees earned, academic institutions attended, former employers, current employer, years of experience, seniority, size of employer, group to which the user belongs or subscribed, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Targeting Templates

A "targeting template" is a set of pre-defined targeting criteria that may be leveraged for one or more content delivery campaigns.

In an embodiment, a targeting template is created if the corresponding content provider provides input to save the targeting criteria that the content provider specified for a content delivery campaign. The targeting template is saved for later reuse by the same content provider that initiated the content delivery campaign.

Each content provider is associated with a content provider account that is maintained by content delivery system 120. A content provider account may include information about each content delivery campaign that the corresponding content provider initiated in the past, including active and inactive content delivery campaigns. Such information may include not only the targeting criteria that was specified for a campaign, but also the campaign's type (e.g., sponsored, dynamic, text), the charging model (e.g., CPM, CPC, CPA), one or more content items of the campaign, one or more bid prices of the campaign, and any performance metrics, such as number of impressions, number of clicks, CTR, dates when the campaign was active, aggregated data about users that interacted with a content item of the campaign, etc.

In an embodiment, when a content provider returns to content provider interface 122, content provider interface 122 presents information about past content delivery campaigns that the content provider initiated with respect to content delivery system 120. The information may include one or more saved targeting templates or a listing thereof. Content provider interface 122 may provide a list of names of previous saved targeting templates. The names may have been specified by (e.g., a representative of) the content provider or may have been (at least partially) automatically generated, such as the date in which the content delivery campaign was created or became active and/or one or more targeting (or attribute) values specified as part of the targeting criteria, such as an industry, a job function, a skill (especially if no other skills are specified), and/or a job title (especially if no other job titles are specified). A "attribute" is a type of targeting attribute. Example attributes include job title, name of past/current employer, employment status, skills, job function, industry, geographic location, degree earned, academic institution attended, etc.

Targeting Persona Template

Content providers might think about their intended audience in terms of "personas," or one or more aspects of one's character that are presented to or perceived by others. Examples of personas include "IT Decision Maker," "Millennials", "New to Job Market", etc. When coming to content delivery system 120, content providers need to translate that persona to targeting criteria supported by content delivery system 120. Such a "translation" is often a tedious and time-consuming process and requires ramping up on each new content delivery platform and understanding its targeting capabilities. A significant number of content providers drop out at the targeting stage of the campaign creation process. Furthermore, content providers might not utilize the full targeting capabilities and, as a result, reach only a small subset of the target audience available on that platform. As a result, content providers' campaigns will fail to reach an intended audience and spend an allocated budget.

By automatically generating targeting persona templates, embodiments help content providers translate their targeting personas to targeting criteria and provide suggestions on possible and related targeting persona templates that they can leverage in creating a content delivery campaign. In other words, embodiments allow discovering common/popular targeting personas and provide pre-built targeting templates so that content providers can effortlessly set up their respective content delivery campaigns. Embodiments also enable content providers to reach a maximum audience since different techniques may be utilized to discover the relevant audience.

Template Generation Based on Targeting Criteria

In an embodiment, a targeting template is automatically generated for a content provider based on multiple sets of targeting criteria specified by one or more other content providers. There are multiple ways in which other content providers' targeting criteria may be leveraged. For example, sets of targeting criteria of content providers in a particular industry are identified and the top N most common attribute-value pairs across those sets of targeting criteria are selected for an industry-specific targeting template. If a content provider, whether new or old to content delivery system 120, is associated with the particular industry, then that industry-specific targeting template is presented as an option. In this way, no automatically generated targeting template is copied from a set of targeting criteria belonging to a single content provider.

As another example, sets of targeting criteria from different content providers are grouped by similarity. Two sets of targeting criteria are similar if they share multiple targeting criteria in common. Embodiments are not limited to any particular type of similarity measure. A first similarity measure may be whether two sets of targeting criteria share more than a particular number (e.g., four) targeting attributes in common. A second similarity measure may be whether two sets of targeting criteria share more than a particular number (e.g., eight) of attribute-value pairs in common.

A difference between the former example and the latter example is that some targeting attributes may appear multiple times in a set of targeting criteria, such as job title, skills, and geographic location. For example, a content provider might specify multiple job titles, at least one of which a user profile must contain in order to be a candidate for the corresponding content delivery campaign. In the first similarity measure, two targeting templates may match on the job title attribute even if only one specified job title (e.g., software engineer) is found in both targeting templates. Similarly, in the first similarity measure, two sets of targeting criteria that include the same job title when multiple specified job titles are found in both sets of targeting criteria may only result in a similarity measure of 1, barring other shared targeting attributes. In the second similarity measure, each attribute-value pair that is found in both targeting templates is counted toward the threshold number. For example, if there are eight job titles in common, then the targeting templates are considered similar targeting templates, even if there are no other matching targeting attributes.

Figure 2:
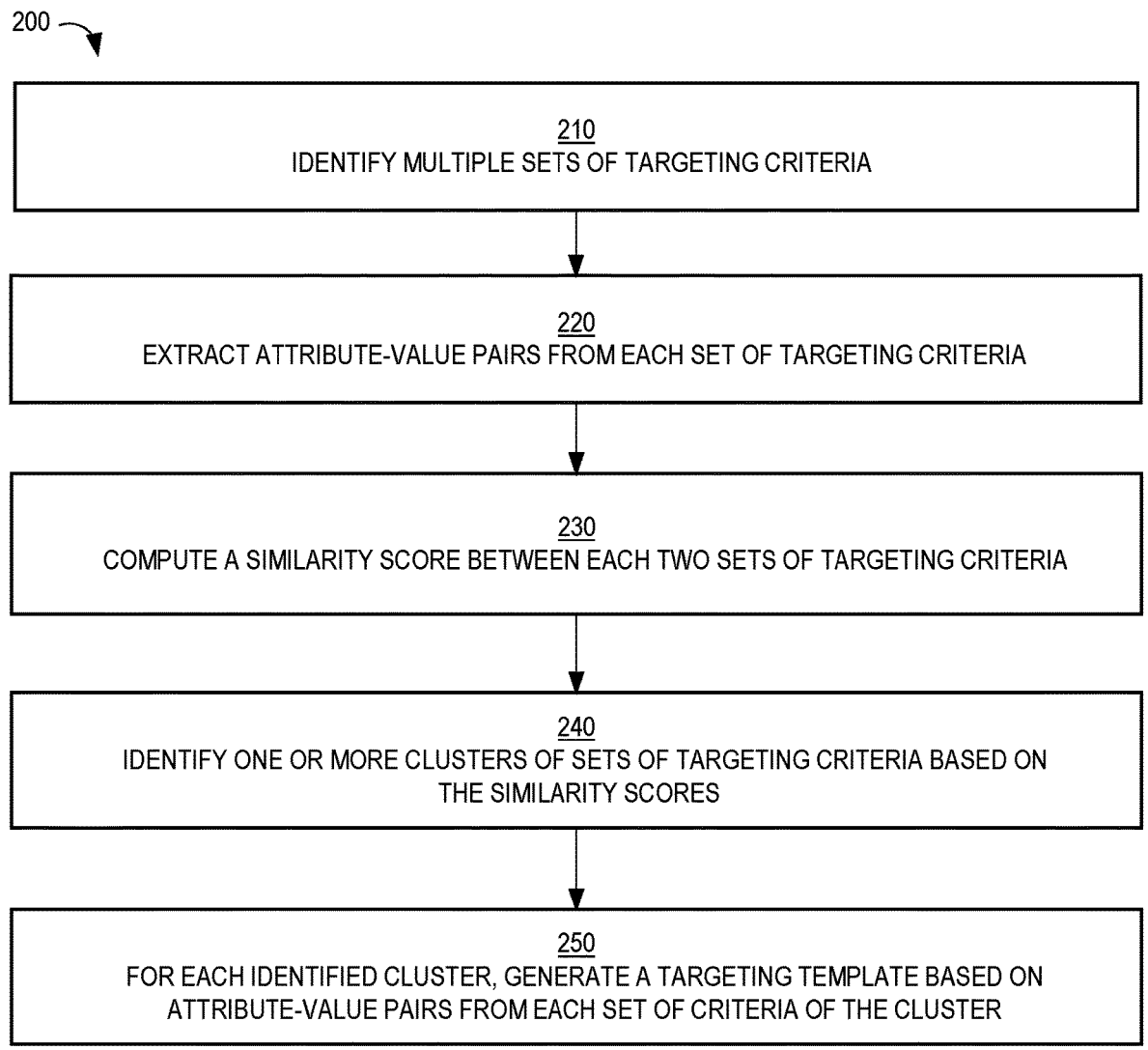
FIG. 2 is a flow diagram that depicts an example process for automatically generating a targeting template based on targeting criteria specified by different content providers, in an embodiment.

FIG. 2 is a flow diagram that depicts an example process 200 for automatically generating a targeting template based on targeting criteria specified by different content providers, in an embodiment. Process 200 may be performed by content delivery system 120 or another system or component affiliated with content delivery system 120.

At block 210, multiple sets of targeting criteria are identified. Block 210 may involve identifying all possible sets of targeting criteria, such as targeting criteria used by different content providers across their respective content delivery campaigns. Alternatively, block 210 involves ignoring certain sets of targeting criteria. For example, sets of targeting criteria that are for test purposes are ignored. Such targeting criteria may have the word "test" in their name or description. As another example, sets of targeting criteria that have fewer than a certain number (e.g., four) of targeting attributes or attribute-value pairs (e.g., seven) are ignored.

In a related example, only previously-used targeting criteria from content providers that satisfy certain criteria are identified, such as content providers that are greater than (or less than) a particular size (or number of employees), content providers that are associated with a particular industry, etc.

At block 220, for each identified set of targeting criteria, the targeting criteria is extracted and split up into a collection of targeting segments in the format of attribute-value pairs (attribute, value).

Block 220 may involve removing certain targeting attributes or attribute-value pairs, such as geographic region, and contextual attributes, such as "contextualAdZones" (or the slot zone from the context of the content request), "contextualAdSizes" (or the slot size from the context), "contextualCountries" (or the countries from the context), and "contextualCompanies" (or the organizations from the context). In this way, only "key" targeting attributes are retained, such as job title, industry, job function, field of study, former employers, current employer, years of experience, seniority, size of employer, and group(s) to which the user belongs or subscribed. The following table below shows a collection of targeting segments (or attribute-value pairs) for each set of targeting criteria:

|  | Targeting Criteria | Targeting Segments Breakdown |
|---|---|---|
| Targeting Criteria 1 (TC1) | (Seniority = CXO OR Seniority = VP) AND (Function = IT OR Function = Engineering) | Seniority = CXO Seniority = VP Function = IT Function = Engineering |
| Targeting Criteria 2 (TC2) | (Seniority = VP OR Seniority = Director) AND (Function = IT OR Function = Operations) | Seniority = VP Seniority = Director Function = IT Function = Operations |
| Targeting Criteria 3 (TC3) | (Seniority = Owner OR Seniority = CXO) AND (Function = IT) | Seniority = Owner Seniority = CXO Function = IT |

Each set of targeting criteria specifies two targeting attributes (i.e., seniority and job function). The first and third sets of targeting criteria specify three attribute-value pairs (or segments) while the second set of targeting criteria (i.e., TC2) specifies four attribute-value pairs.

At block 230, a similarity score between two sets of targeting criteria is computed based on the collection of attribute-value pairs belonging to each. Similarity scores are used to create multiple clusters of similar sets of targeting criteria. Either the original attribute-value pair, or its string concatenation, or a tokenized value, can be used to compute the distance between two sets of targeting criteria. Since there are multiple possible targeting attributes and each attribute can take multiple values, this could be a multidimensional problem. A distance function is defined that maps the multidimensional problem into a single dimension one. For example, the similarity between two sets of targeting criteria may be defined as the percentage of commonly used attribute-value pairs, i.e., S(TC1, TC2)=COUNT(INTERSECTION targeting segments in TC1 and TC2)/COUNT(UNION targeting segments in TC1 and TC2), where S(TC1, TC2) refers to a similarity score of TC1 and TC2.

This similarity definition treats different targeting segments equally. However, different attributes and values may have different impact and implication. An enhanced and generic alternative to the above similarity definition is to assign a weight factor W(s) to each targeting segment (or attribute-value pair), in which case the similarity function may be defined as follows:

$$S(TC1, TC2) = \text{SUM}((\text{each targeting segment } s \text{ in INTERSECTION of } TC1 \text{ and } TC2)*W(s))/\text{SUM}((\text{each targeting segment } s \text{ in UNION of } TC1 \text{ and } TC2)*W(s))$$

One such weight factor is audience count for that targeting segment. It is reasonable to assign higher weight for a targeting segment with a broader audience. The two tables below illustrate an example in which audience count is used as weight factor:

| Attribute-value pair (or Targeting Segment): s | Using audience count (million members in US) as weight factor W(s) |
|---|---|
| Seniority = Owner | 7.7 |
| Seniority = CXO | 4.1 |
| Seniority = VP | 3.5 |
| Seniority = Director | 6.7 |
| Function = IT | 5.1 |
| Function = Operations | 14 |
| Function = Engineering | 5.5 |

|  | Intersection | Union | Similarity |
|---|---|---|---|
| (TC1, TC2) | Seniority = VP: 3.5 Function = IT: 5.1 SUM = 8.6 | Seniority = CXO: 4.1 Seniority = VP: 3.5 Seniority = Director: 6.7 Function = IT: 5.1 Function = Operations: 14 Function = Engineering: 5.5 SUM = 38.9 | 0.22 |
| (TC1, TC3) | Seniority = CXO: 4.1 Function = IT: 5.1 SUM = 9.2 | Seniority = Owner: 7.7 Seniority = CXO: 4.1 Seniority = VP: 3.5 Function = IT: 5.1 Function = Engineering: 5.5 SUM = 25.9 | 0.36 |
| (TC2, TC3) | Function = IT: 5.1 SUM = 5.1 | Seniority = Owner: 7.7 Seniority = CXO: 4.1 Seniority = VP: 3.5 Seniority = Director: 6.7 Function = IT: 5.1 Function = Operations: 14 SUM = 41.1 | 0.12 |

If the same weight factor W(s) is assigned to all attribute-value pairs, then this similarity function definition reduces to the first similarity function introduced, i.e., S(TC1, TC2) =COUNT(INTERSECTION targeting segments in TC1 and TC2)/COUNT(UNION targeting segments in TC1 and TC2).

At block 240, one or more clusters of sets of targeting criteria are identified based on generated similarity measures/scores. Embodiments are not limited to any particular clustering technique. One clustering technique minimizes the sum of the distance of a cluster. In another clustering technique, the sum of the similarity of a cluster is maximized.

Block 240 may involve applying one or more restrictions or rules that dictate what constitutes a cluster of a set of similar targeting criteria. For example, a cluster may require a threshold number of sets of targeting criteria. For example, if a cluster has less than six sets of targeting criteria, then a targeting template is not generated based on those sets of targeting criteria.

Another possible restriction for sets of targeting criteria to be considered a cluster is that each set of targeting criteria may need to be considered similar (according to one or more similarity measures) to a threshold number (e.g., five), or percentage (e.g., 80%), of other sets of targeting criteria in the cluster.

At block 250, for each identified cluster, a targeting template is generated based on attribute-value pairs from each set of targeting criteria in the cluster. Candidate attribute-value pairs extracted from the cluster may be ordered based on frequency. In an embodiment, the top N (e.g., ten) most frequent attribute-value pairs are selected for a new targeting template.

In a related embodiment, a score is computed for each attribute-value pair within a cluster. For example, a weight factor W(t) is defined for each set of targeting criteria to signify its value. An example of a weight factor is content provider value, which may be determined based on one or more of the following: how long the corresponding content provider has interacted with content delivery system 120, how much the content provider has spent interacting with content delivery system 120, an average/median user selection rate (e.g., CTR) of the content provider's content delivery campaigns, and a conversion rate of the content provider's content delivery campaigns (where "conversion" may be one of many possible actions that a user interacting with a content item of the campaign might perform, such as purchasing a product, signing up for a newsletter/email, applying to a job opening, or filling out a form). Another example of a weight factor is a campaign value, which may be determined based on one or more of the following: whether the budget of the corresponding campaign was spent, a user selection rate of the campaign, a conversion rate of the campaign.

The score for an attribute-value pair may then be defined as a normalized weighted sum that an attribute-value pair is used in different sets of targeting criteria within the cluster, i.e.:

Score(s)=SUM(W(t): for each set of targeting criteria
t that this targeting segment s is in)/SUM(W(t):
every set of targeting criteria in the cluster)

In an embodiment, the attribute-value pairs that have a higher score than some pre-selected (yet adjustable) threshold are retained and used to generate a targeting template by combining those retained attribute-value pairs. In this way, the final set of attribute-value pairs may be either a full union (i.e., threshold=0) of all the attribute-value pairs, or a more condensed version that contains only the most commonly used and/or most important attribute-value pairs within that cluster. The two tables below illustrate how a score is calculated for each attribute-value pair (or targeting segment) of a cluster based on example weight factors:

| Targeting Criteria | Weight factor W(t) for a set of targeting criteria |
|---|---|
| TC1 | 4.5 |
| TC2 | 1.2 |
| TC3 | 2.0 |

| Attribute-value pair | Appears in | Weighted Sum | Normalized Weighted Sum |
|---|---|---|---|
| Seniority = Owner | TC3 | 2.0 | 0.26 |
| Seniority = CXO | TC1, TC3 | 4.5 + 2.0 = 6.5 | 0.84 |
| Seniority = VP | TC1, TC2 | 4.5 + 1.2 = 5.7 | 0.74 |
| Seniority = Director | TC2 | 1.2 | 0.16 |
| Function = IT | TC1, TC2, TC3 | 4.5 + 1.2 + 2.0 = 7.7 | 1.0 |
| Function = Operations | TC2 | 1.2 | 0.16 |
| Function = Engineering | TC1 | 4.5 | 0.58 |

In this example, if the top five attribute-pairs are selected, then the following attribute-value pairs would be selected for a targeting template: Function=IT, Seniority=CXO, Seniority=VP, Function=Engineering, and Seniority=Owner.

In a related embodiment, instead of selecting the top N scoring attribute-values pairs or selecting all attribute-value pairs with a score above a certain threshold for the targeting template, the attribute-value pairs are grouped based on attribute. Then, the top N from each group are selected for the targeting template (where N may be the same or different for different groups) or the attribute-value pairs with scores above a group-specific threshold are selected for the targeting template.

Figure 3:
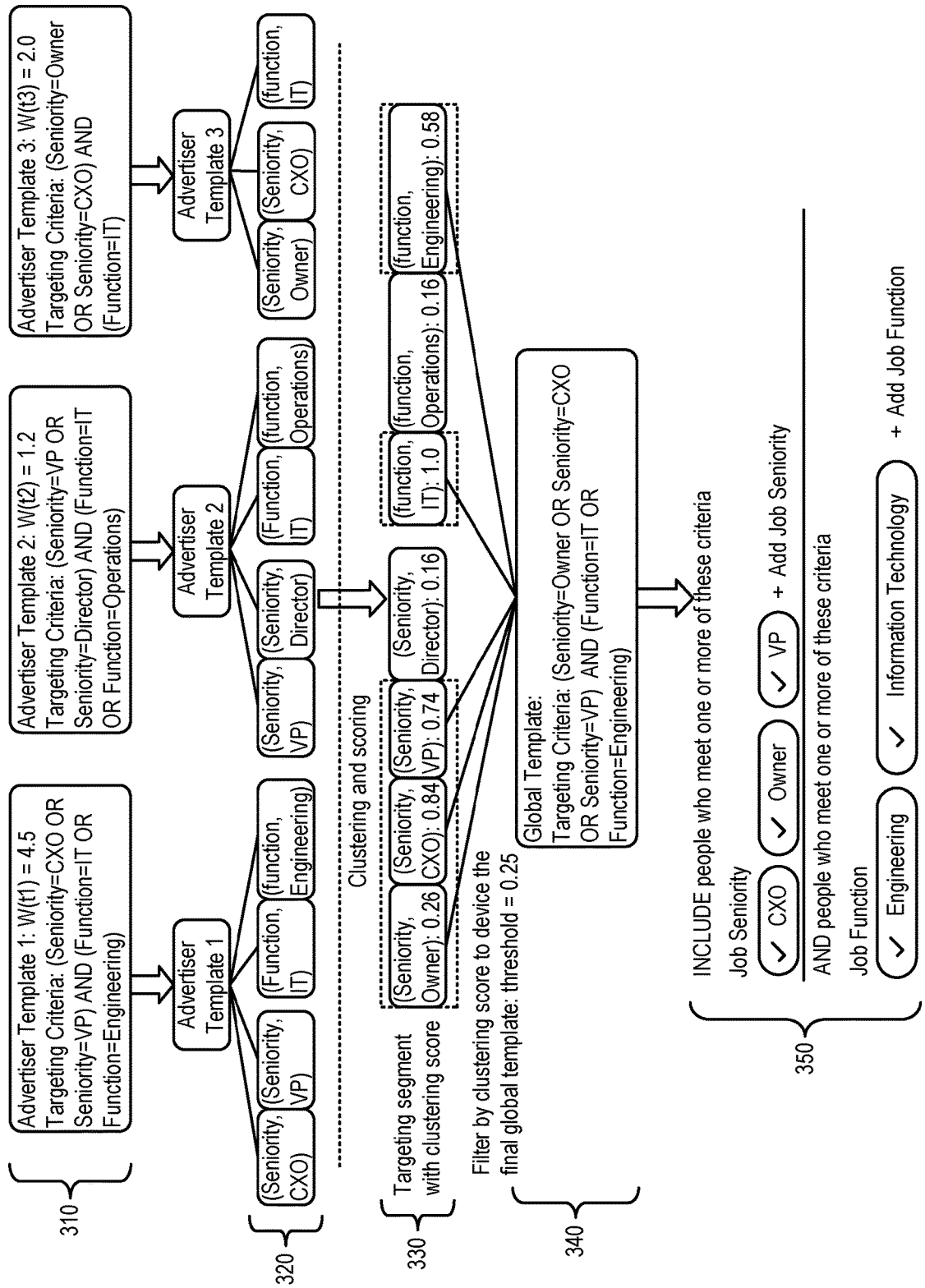
FIG. 3 is a block diagram that illustrates how a targeting template may be generated using an example scenario, in an embodiment.

FIG. 3 is a block diagram that illustrates the above example scenario and their respective values in graphic form, in an embodiment. Section 310 depicts three content provider-specific "templates," each comprising a set of targeting criteria and a weight. Section 320 depicts a collection of attribute-value pairs from each set of targeting criteria. Section 330 depicts a score for each attribute-value pair identified in section 320. Section 340 depicts a final set of attribute-values pairs for a "global" (or cluster-wide) template. Section 350 depicts an example display (e.g., through content provider interface 122) of the final set of attribute-value pairs and selectable options to add additional values for each of the two attributes.

Template Generation Based on User Data

In an embodiment, a targeting template is automatically generated based on attributes of a particular set of users. The particular set of users may be determined based on one or more criteria. For example, users that have interacted with content items associated with a particular industry or project category are identified. "Interaction" with a content item may involve selecting or clicking the content item, scrolling through the content item, viewing at least a portion of a video (if the content item includes a video), saving the content item for later viewing, and "liking," "sharing," or "commenting" on the content item (all examples of public actions with respect to the content item).

As another example, users that are first-degree connections of certain representatives (e.g., sales representatives) of one or more organizations are identified. In this example, organizations associated with a particular industry or a particular product category are identified and then first-degree connections of the sales team of those organizations are identified. Thus, if there are five industries, then five different sets of users are identified. If there are twenty product categories, then twenty different sets of users are identified.

Once a set of users is identified, a union of the attributes-value pairs of the users in that set (or a strict subset of the union after one or more filters are applied) are considered for a targeting template.

Figure 4:
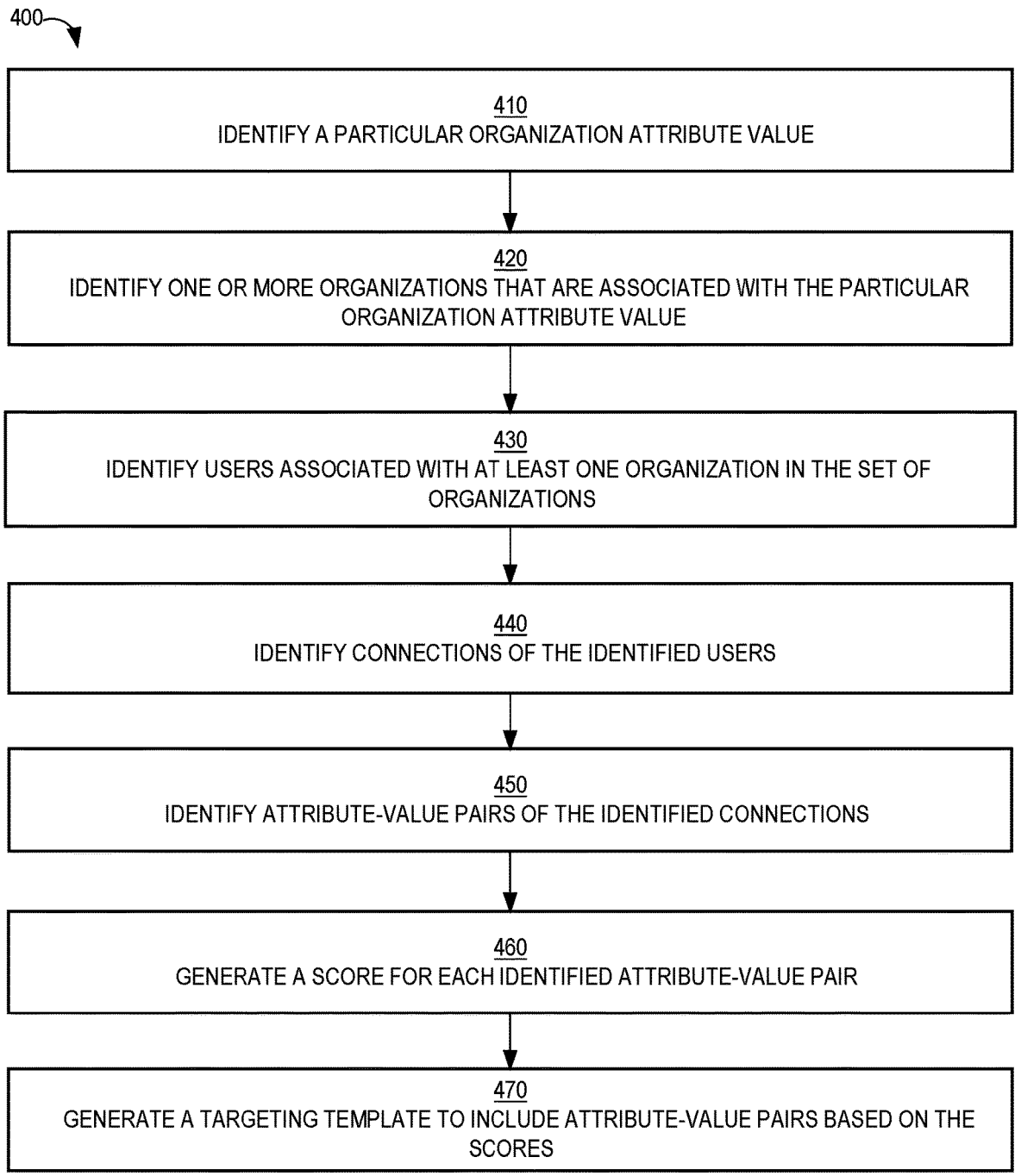
FIG. 4 is a flow diagram that depicts a process for automatically generating a targeting template based on attributes of a set of users, in an embodiment.
Figure 5:
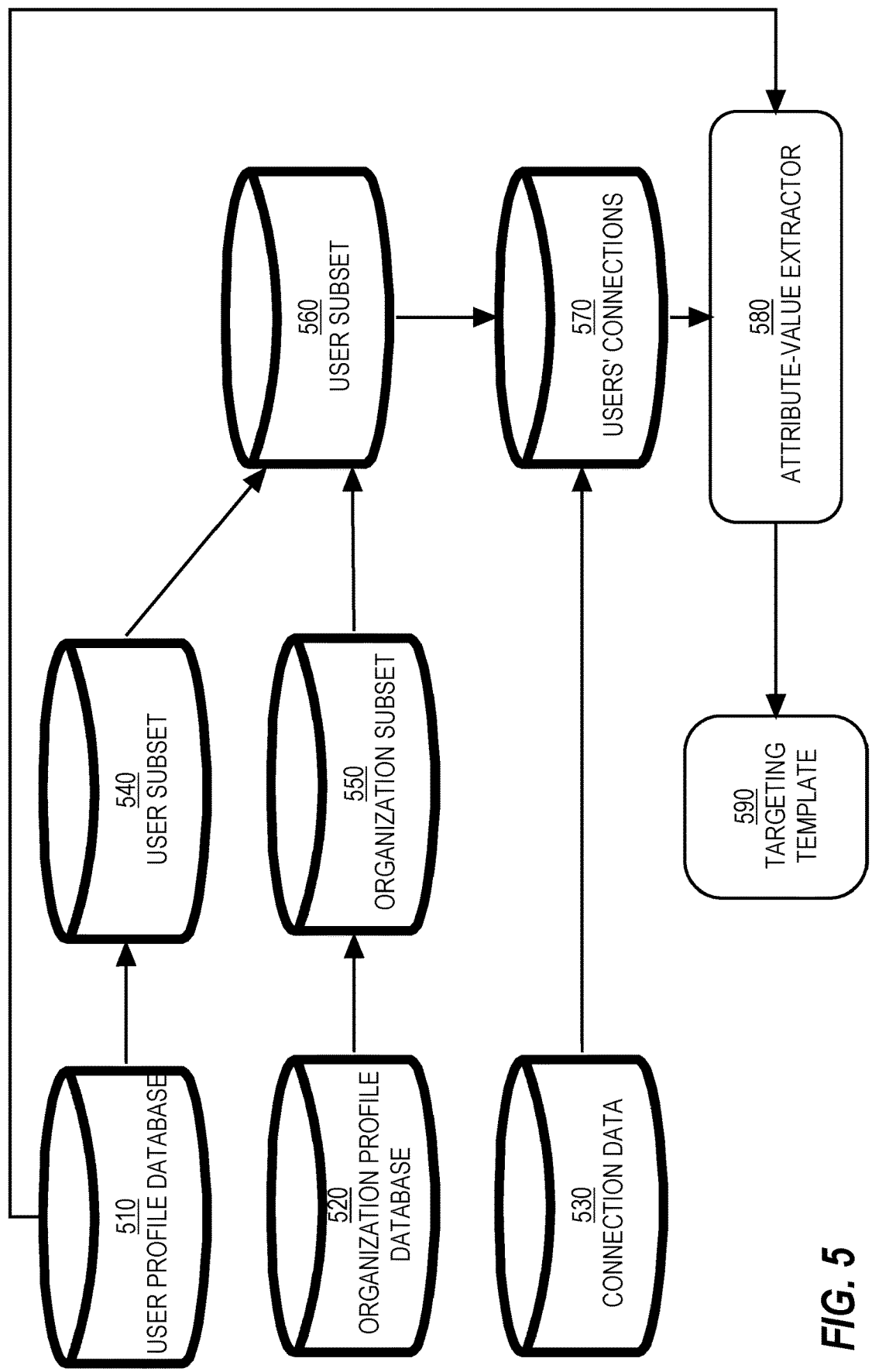
FIG. 5 is a block diagram that depicts data sources for generating a targeting template, in an embodiment.

FIG. 4 is a flow diagram that depicts a process 400 for automatically generating a targeting template based on attributes of a set of users, in an embodiment. Process 400 may be performed by content delivery system 120 or another system or component affiliated with content delivery system 120. Process 400 is also described in context of FIG. 5, which depicts how process 400 might be implemented. FIG. 5 is a block diagram that depicts three main data sources: user profile database 510 (which stores multiple user profiles), organization profile database 520 (which stores multiple organization profiles), and connection data 530 (which stores a list of connections for each user indicated in user profile database 510). Alternatively, connection data 530 is incorporated into user profile database 510.

At block 410, a particular organization attribute value is identified. Examples of attributes include industry and product category. Example industries (or values for the 'industry' attribute) include Finance, Information Technology, Marketing, Sales, Education, Entertainment, Automotive, and Legal Services. Example product categories (or values for the 'product category' attribute) include computers, smartphones, clothing, books, movies, pet supplies, software, sports, outdoors, vehicles, and video games. The organization attribute value may be specified by an administrator of content delivery system 120. Alternatively, the organization attribute value may be specified by a content provider through, for example, content provider interface 122.

At block 420, one or more organizations that are associated with the particular organization attribute value is identified. Block 420 may involve analyzing an organization listing or organization profiles in a database. Block 420 may involve filtering out (or ignoring) organizations that have multiple lines of business. Such a filtering may involve filtering by company size (e.g., <500 employees) and/or by number of industries to which the organization belongs. For example, if an organization is associated with more than one industry (e.g., as indicated in a corresponding organization profile), then the organization is excluded from further consideration. Such filtering of organizations may be performed because organizations with multiple lines of business may make the resulting targeting templates "noisy" or contain irrelevant or non-useful data. Hence, the filtering allows only relatively small to midsize organizations to be considered.

Organization subset 550 is an example of a set of organizations that is identified as a result of block 420.

At block 430, users associated with at least one organization in the set of organizations are identified. Block 430 may involve analyzing a user profile database to determine, for each profile, whether the profile lists an organization in the set of organization as a current employer. Block 430 may also involve determining, for each profile that lists an organization as a current employer, also lists a particular job title and/or job function (e.g., sales representative).

User subset 540 is an example of users that are identified as a result of an intermediate stage of block 430, such as identifying users that have a particular job function or have a particular job title. User subset 560 is an example of users that are identified from user subset 540 and as a result of a final stage of block 430, such as identifying users in subset 540 who are associated with (e.g., employed by) one of the organizations identified in organization subset 550.

At block 440, connections of the users identified in block 430 are identified. The connections may be identified based on the users' profiles, each of which may include a listing of friends/connections of the corresponding user. The connections that are identified in block 440 may be limited to first-degree connections, first- and second-degree connections, or some other set of connections. Block 440 is performed because certain professionals (e.g., a sales team) of a seller organization tend to be well-connected to decision makers of buyer organizations.

Users' connections 570 is an example of connections (i.e., users) that are identified as a result of block 440.

At block 450, attribute-value pairs of the connections identified in block 440 are identified. Block 450 may involve identifying, for each identified connection, a user profile in a profile database and extracting attribute-value pairs of certain attributes, such as job title, job function, industry, skills, location, degrees earned, fields of study, and keywords. For some attributes (e.g., skills, degrees earned, and fields of study), a user may list multiple values.

At block 460, a score is generated for each attribute-value pair identified in block 450. For example, for each attribute-value pair, a score may be the total count of that attribute-value pair among the identified connections. The top N attribute-value pairs based on count may be retained. Alternatively, all attribute-value pairs with scores greater than a particular threshold (which may be adjustable) are retained.

At block 470, a targeting "persona" template for the particular organization attribute value is generated. The persona template includes the attribute-value pairs with the highest scores. Block 470 may involve using only a few attributes in order to generalize the targeting template and ensure a large enough audience coverage. The specific combination of attributes may follow the most commonly used pattern by the current content provider's template or campaign. One reason for doing this is because ANDing more attributes will narrow down the audience size and, at a certain point, the issue of a small audience size might be realized and audience reach will be limited.

Also, block 470 may involve applying one or more rules when abstracting attribute-value pairs to generate a persona template. Users might have all or any subset of the entire targeting attributes available. However, for targeting criteria, an arbitrary combination of targeting attributes might not be allowed. For example, job title cannot be ANDed with job function or job seniority, organization industry cannot be ANDed with organization name, etc. One approach is to split the abstraction into multiple persona templates that focus and utilize different targeting attributes in such cases.

User attribute extractor 580 is an example component (implemented in software, hardware, or a combination of software and hardware) that implements blocks 450-470, resulting in the generation of targeting template 590.

Process 400 may be repeated for different industries and/or product categories.

Figure 6A:
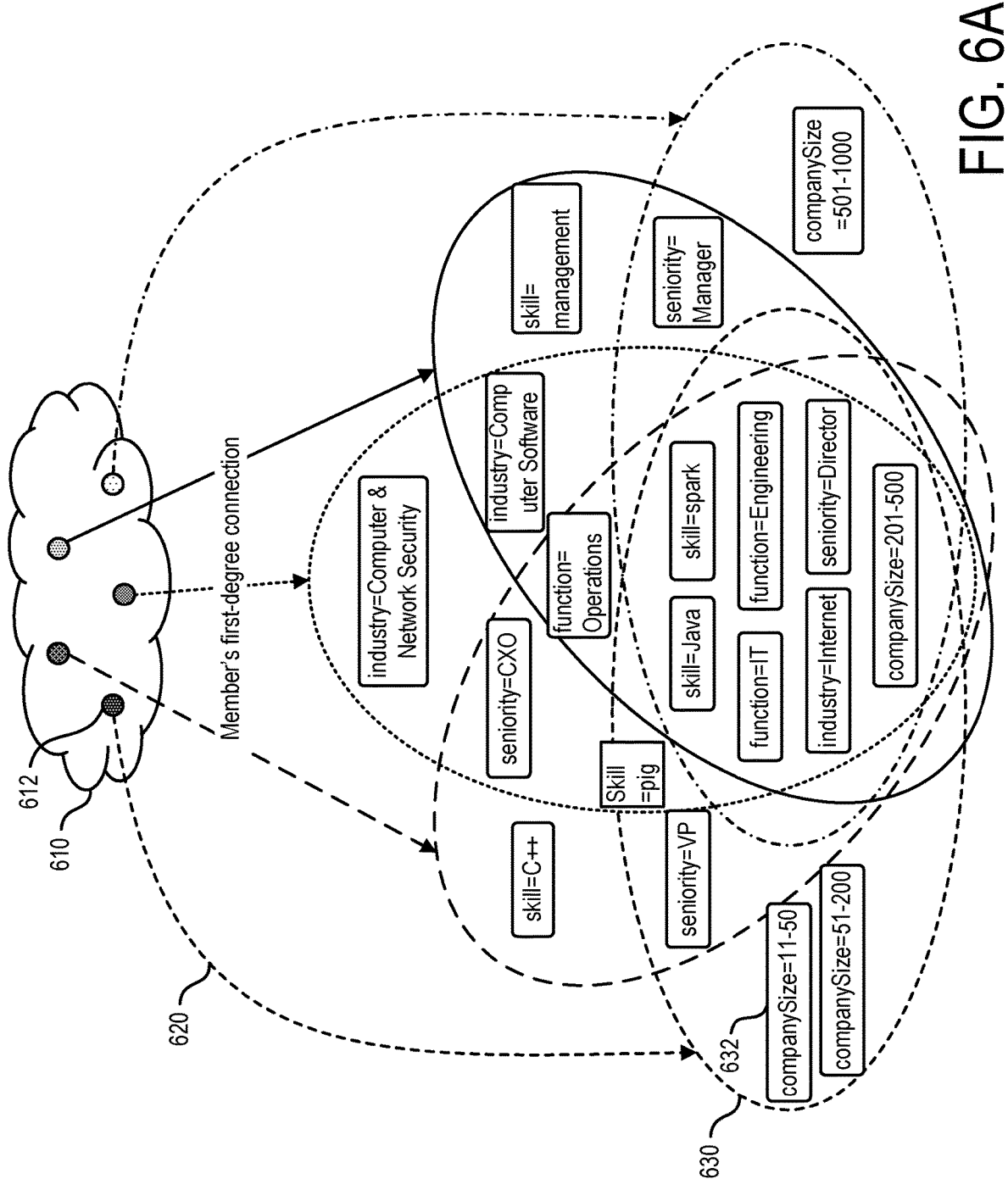
FIG. 6A is a block diagram that depicts example connection attribute data, in an embodiment.

FIG. 6A is a block diagram that depicts example connection attribute data, in an embodiment. Cloud 610 represents a user that satisfies one or more criteria, such as a sales person of an organization (e.g., company) associated with a particular organization attribute value (e.g., a particular industry). The points within cloud 610 (including point 612) represent (e.g., first-degree) connections of the user represented by cloud 610. The lines emanating from the points in cloud 610 (including line 620) represent links to attribute data of the corresponding connection. For example, attribute set 630 corresponds to the connection represented by point 612 and includes multiple attribute-value pairs, such as pair 632, which indicates that the connection is associated with (e.g., employed by) a relatively small organization of size 11-50. Attribute set 630 includes attribute-value pairs that are shared by other connections of the user represented by cloud 610.

Figure 6B:
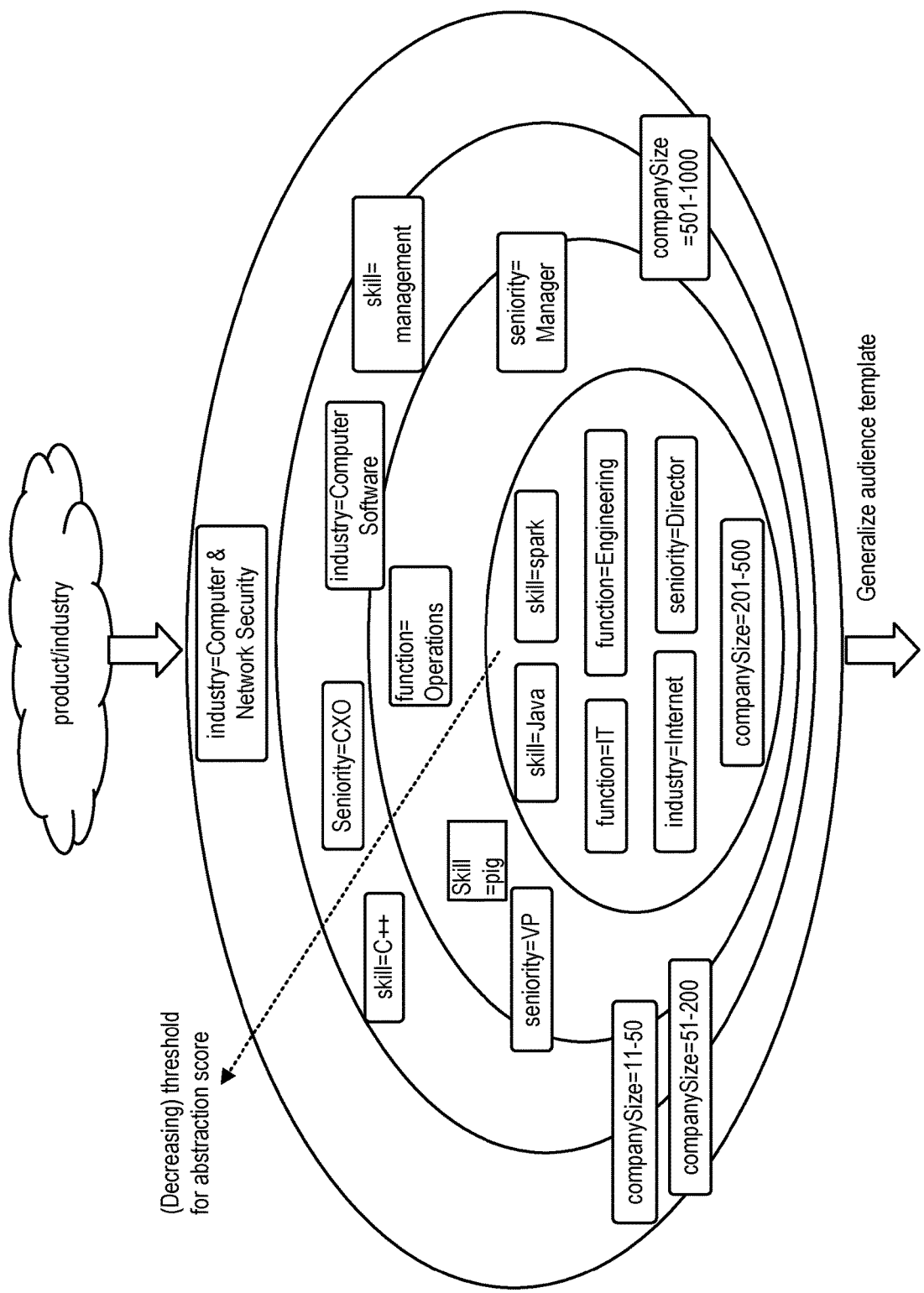
FIG. 6B is a block diagram that depicts attribute-value pairs that are found in one or more connections of a user, in an embodiment.

FIG. 6B is a block diagram that depicts attribute-value pairs that are found in one or more connections of the user represented by cloud 610, in an embodiment. The inner circles include attribute-value pairs that are shared by more connections, while outer circles include attribute-value pairs that are shared by less connections. Thus, attribute-value pairs in the inner circle may be scored higher than attribute-value pairs that are in the outer circles.

FIG. 6C is a screenshot of an example user interface 650 that displays data from a targeting template based on the attribute-value pairs from FIG. 6B, in an embodiment. Thus, the targeting (or audience) template is generalized output from the process associated with FIG. 6B. User interface 650 specifies attributes Member Skills, Job Function, Job Seniority, Company Industry, and Company Size. These attribute names and the values listed adjacent to each of these attributes are based on the attribute-value-pairs in the inner-most circle in FIG. 6B.

A variation of process 400 involves identifying organizations that are associated with the particular organization attribute value (similar to block 410) and that have created one or more content delivery campaigns (e.g., through content provider interface 122). Then, users who have interacted with (e.g., clicked on) one or more content items of those content delivery campaigns are identified. Then, attribute-values of those users are identified (similar to block 450) and used to generate a targeting persona template (similar to blocks 460-470). Thus, connections of the users identified in this variation are irrelevant and are not considered.

Presenting Persona Templates

In an embodiment, one or more automatically-generated persona templates are presented to one or more content providers. Such presentation may occur through content provider interface 122.

An automatically-generated persona template may be presented in one or more ways. For example, a name of a persona template is presented for user selection. A name of a persona template may be manually specified based on administrator review or automatically generated. For example or an automatic generation of a name, an industry of each content provider associated with each targeting template in a group is determined (e.g., from an organization database that lists attributes of each organization of multiple organizations). The industry that is identified the most in a group of similar sets of targeting criteria is used to create a name for a persona that is generated based on that group. Other examples of attribute values of a content provider or of targeting templates in a group may be used to name a persona template that is generated based on the group include job function, job title, skill, and location. In fact, multiple attribute values of a content provider or from sets of targeting criteria of a group may be used to generate a name for the persona template, such as "Product Manager—Seattle."

Another way in which a persona template may be presented is by listing all attribute-value pairs in the persona template in the same interface or on the same web page. Multiple persona templates may be listed concurrently in this manner. If a particular attribute is part of multiple attribute-value pairs (e.g., multiple job titles), then a name for the particular attribute may be listed once and the values for that particular attribute may be listed adjacent to (e.g., below) the name. This approach is not practical, at least initially, if there are many persona templates from which to choose.

In an embodiment, different persona templates are presented to different content providers. For example, a content provider that is associated with a particular industry (or another attribute value) is presented with persona templates that are associated with that particular industry (or attribute value).

In an embodiment, input, from a content provider, that specifies an attribute value is used to lookup up all persona templates that include that attribute value and names of those persona templates are presented to the content provider for further inspection. For example, if a content provider (or representative thereof) specifies "Software Engineer" for the attribute job title, then content delivery system 120 identifies all persona templates that include "Software Engineer" as a job title (or, optionally, a related job title, such as "Programmer"; in which case, an exact match is not required) and presents a list of those "matching" persona templates to the content provider.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
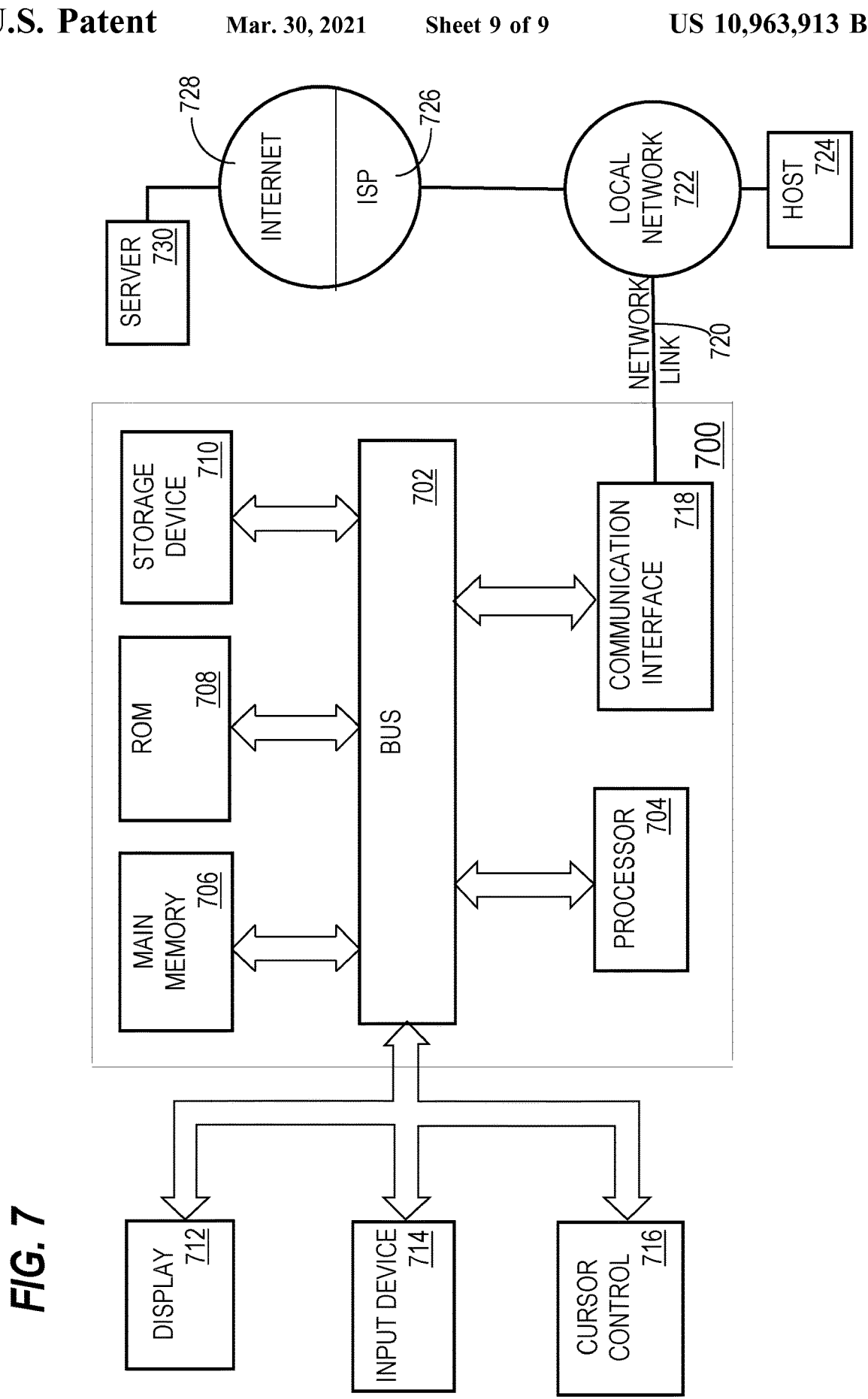
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying a plurality of sets of targeting criteria that includes a first set of targeting criteria provided by a first content provider and a second set of targeting criteria provided by a second content provider that is different than the first content provider;
    based on the plurality of sets of targeting criteria, creating a plurality of clusters of sets of targeting criteria;
    for each cluster in the plurality of clusters, generating a targeting template based on a set of targeting criteria that belong to said each cluster;
    in response to receiving input from a content provider, causing one or more targeting templates to be presented to the content provider;
    wherein the method is performed by one or more computing devices.

2. The method of claim 1, wherein causing comprises causing a plurality of labels to be presented to the content provider, wherein each label corresponds to a different targeting template of a plurality of targeting templates, the method further comprising:
    in response to selection of a particular label of the plurality of labels:
        identifying a set of attribute-value pairs associated with the particular label,
        causing the set of attribute-value pairs to be presented.

3. The method of claim 1, further comprising:
    for each set of targeting criteria in the plurality of sets of targeting criteria:
        comparing said each set of targeting criteria to one or more other sets of targeting criteria in the plurality of sets of targeting criteria to generate a similarity score;

determining whether said each set of targeting criteria is similar to the one or more other sets based on the similarity score.

4. The method of claim 1, further comprising:
for a particular cluster of the plurality of clusters, identifying a second plurality of sets of targeting criteria that belong to the particular cluster;
identifying a plurality of attribute-value pairs from the second plurality of sets of targeting criteria;
for each attribute-value pair of the plurality of attribute-value pairs, determining a frequency of said each attribute-value pair among the second plurality of sets of targeting criteria;
wherein generating the targeting template comprises including, in the targeting template, a strict subset of the plurality of attribute-value pairs based on frequency of each attribute-value pair in the plurality of attribute-value pairs.

5. The method of claim 1, further comprising:
for a particular cluster of the plurality of clusters, identifying a second plurality of sets of targeting criteria that belong to the particular cluster;
identifying a plurality of attribute-value pairs from the second plurality of sets of targeting criteria;
for each attribute-value pair of the plurality of attribute-value pairs, determining an organization attribute value that is associated with an organization that specified said each attribute-value pair in a particular set of targeting criteria in the second plurality of sets of targeting criteria;
wherein generating the targeting template comprises including, in the targeting template, a strict subset of the plurality of attribute-value pairs based on the organization attribute value associated with each attribute-value pair in the plurality of attribute-value pairs.

6. The method of claim 5, wherein the organization attribute value is one of a length of time a certain content provider that is associated with said each attribute-value pair has interacted with a content delivery system, a number of resources provided by the certain content provider and utilized by the content delivery system, a user selection rate associated with the certain content provider, or a conversion rate associated with the certain content provider.

7. The method of claim 1, further comprising:
for a particular cluster in the plurality of clusters, based on a particular attribute value associated with the particular cluster or with one or more attribute-values in a particular targeting template generated for the particular cluster, assigning a name to the particular targeting template;
causing the name to be presented to on a screen of a computing device.

8. The method of claim 1, wherein a particular targeting template generated for a particular cluster of the plurality of clusters includes (1) a first attribute-value pair that was specified by the first content provider and (2) a second attribute-value pair that was specified by the second content provider.

9. The method of claim 1, further comprising:
filtering out a particular set of targeting criteria that is associated with a test or has fewer than a certain number of attribute-value pairs;
wherein the plurality of sets of targeting criteria does not include the particular set of targeting criteria.

10. One or more storage media storing instructions which, when executed by one or more processors, cause:
identifying a plurality of sets of targeting criteria that includes a first set of targeting criteria provided by a first content provider and a second set of targeting criteria provided by a second content provider that is different than the first content provider;
based on the plurality of sets of targeting criteria, creating a plurality of clusters of sets of targeting criteria;
for each cluster in the plurality of clusters, generating a targeting template based on a set of targeting criteria that belong to said each cluster;
in response to receiving input from a content provider, causing one or more targeting templates to be presented to the content provider.

11. The one or more storage media of claim 10, wherein the instructions, when executed by the one or more processors, further cause:
for each set of targeting criteria in the plurality of sets of targeting criteria:
comparing said each set of targeting criteria to one or more other sets of targeting criteria in the plurality of sets of targeting criteria to generate a similarity score;
determining whether said each set of targeting criteria is similar to the one or more other sets based on the similarity score.

12. The one or more storage media of claim 10, wherein causing comprises causing a plurality of labels to be presented to the content provider, wherein each label corresponds to a different targeting template of a plurality of targeting templates, wherein the instructions, when executed by the one or more processors, further cause:
in response to selection of a particular label of the plurality of labels:
identifying a set of attribute-value pairs associated with the particular label,
causing the set of attribute-value pairs to be presented.

13. The one or more storage media of claim 10, wherein the instructions, when executed by the one or more processors, further cause:
for a particular cluster of the plurality of clusters, identifying a second plurality of sets of targeting criteria that belong to the particular cluster;
identifying a plurality of attribute-value pairs from the second plurality of sets of targeting criteria;
for each attribute-value pair of the plurality of attribute-value pairs, determining a frequency of said each attribute-value pair among the second plurality of sets of targeting criteria;
wherein generating the targeting template comprises including, in the targeting template, a strict subset of the plurality of attribute-value pairs based on frequency of each attribute-value pair in the plurality of attribute-value pairs.

14. The one or more storage media of claim 10, wherein the instructions, when executed by the one or more processors, further cause:
for a particular cluster of the plurality of clusters, identifying a second plurality of sets of targeting criteria that belong to the particular cluster;
identifying a plurality of attribute-value pairs from the second plurality of sets of targeting criteria;
for each attribute-value pair of the plurality of attribute-value pairs, determining an organization attribute value that is associated with an organization that specified said each attribute-value pair in a particular set of targeting criteria in the second plurality of sets of targeting criteria;

wherein generating the targeting template comprises including, in the targeting template, a strict subset of the plurality of attribute-value pairs based on the organization attribute value associated with each attribute-value pair in the plurality of attribute-value pairs.

15. The one or more storage media of claim 14, wherein the organization attribute value is one of a length of time a certain content provider that is associated with said each attribute-value pair has interacted with a content delivery system, a number of resources provided by the certain content provider and utilized by the content delivery system, a user selection rate associated with the certain content provider, or a conversion rate associated with the certain content provider.

16. The one or more storage media of claim 10, wherein the instructions, when executed by the one or more processors, further cause:
for a particular cluster in the plurality of clusters, based on a particular attribute value associated with the particular cluster or with one or more attribute-values in a particular targeting template generated for the particular cluster, assigning a name to the particular targeting template;
causing the name to be presented to on a screen of a computing device.

17. The one or more storage media of claim 10, wherein a particular targeting template generated for a particular cluster of the plurality of clusters includes (1) a first attribute-value pair that was specified by the first content provider and (2) a second attribute-value pair that was specified by the second content provider.

18. The one or more storage media of claim 10, wherein the instructions, when executed by the one or more processors, further cause:
filtering out a particular set of targeting criteria that is associated with a test or has fewer than a certain number of attribute-value pairs;
wherein the plurality of sets of targeting criteria does not include the particular set of targeting criteria.

19. A system comprising:
one or more processors;
one or more storage media storing instructions which, when executed by the one or more processors, cause:
identifying a plurality of sets of targeting criteria that includes a first set of targeting criteria provided by a first content provider and a second set of targeting criteria provided by a second content provider that is different than the first content provider;
based on the plurality of sets of targeting criteria, creating a plurality of clusters of sets of targeting criteria;
for each cluster in the plurality of clusters, generating a targeting template based on a set of targeting criteria that belong to said each cluster;
in response to receiving input from a content provider, causing one or more targeting templates to be presented to the content provider.

20. The system of claim 19, wherein the instructions, when executed by the one or more processors, further cause:
for each set of targeting criteria in the plurality of sets of targeting criteria:
comparing said each set of targeting criteria to one or more other sets of targeting criteria in the plurality of sets of targeting criteria to generate a similarity score;
determining whether said each set of targeting criteria is similar to the one or more other sets based on the similarity score.

* * * * *